United States Patent

Smale

[11] 3,853,201
[45] Dec. 10, 1974

[54] QUIET SNOWMOBILE
[75] Inventor: William B. Smale, Cedarbury, Wis.
[73] Assignee: Outboard Marine Corporation, Waukegan, Ill.
[22] Filed: Mar. 14, 1974
[21] Appl. No.: 451,203

Related U.S. Application Data
[62] Division of Ser. No. 258,260, May 31, 1972, Pat. No. 3,810,518.

[52] U.S. Cl.................................. 181/53, 181/57
[51] Int. Cl............................................. F01n 1/08
[58] Field of Search............ 181/53, 57, 54; 60/312, 60/314

[56] References Cited
UNITED STATES PATENTS

| | | | |
|---|---|---|---|
| 3,462,947 | 8/1969 | Nowak | 181/53 X |
| 3,687,225 | 8/1972 | Nelson | 181/53 X |
| 3,703,938 | 11/1972 | Nelson | 181/53 X |
| 3,786,897 | 1/1974 | Swanson | 181/54 |

Primary Examiner—Richard B. Wilkinson
Assistant Examiner—John F. Gonzales
Attorney, Agent, or Firm—Michael, Best & Friedrich

[57] ABSTRACT

Disclosed herein is a snowmobile including a hood extending from a frame portion to a transverse partition extending upwardly from the frame portion and defining, with the frame portion and with the transverse partition, a substantially closed compartment, together with first wall means extending in the compartment and dividing the compartment into an air supply chamber and an exiting air chamber, second wall means extending in the air supply chamber and dividing the air supply chamber into an entering air sub-chamber and a carburetor air supply sub-chamber communicating with the entering air sub-chamber, and an internal combustion engine mounted on the frame within the compartment and including a pair of cylinders, an engine cooling system including means defining an engine cooling air passage communicating between the entering air sub-chamber and the exiting air chamber, and a carburetor operably communicating with the cylinders and including an air inlet communicating with the carburetor air supply sub-chamber. The snowmobile disclosed herein also includes separate first and second mufflers mounted on the frame in the exiting air chamber and connected to the respective exhaust ports of the cylinder, together with baffled air inlet means communicating with the air supply chamber and baffled air outlet means communicating with the exiting air chamber.

The mufflers disclosed herein each include a series of barriers dividing the muffler into a series of chambers with one of the chambers including a single exhaust megaphone and with another of the chambers including a perforated barrier adjacent to one of the end walls of the muffler.

3 Claims, 6 Drawing Figures

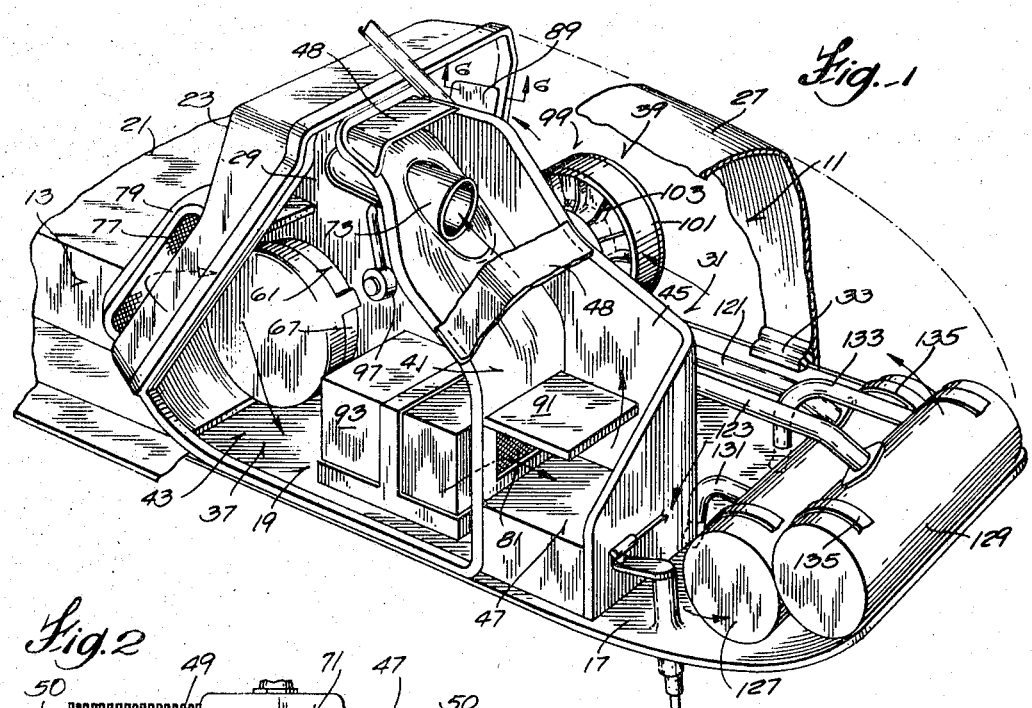
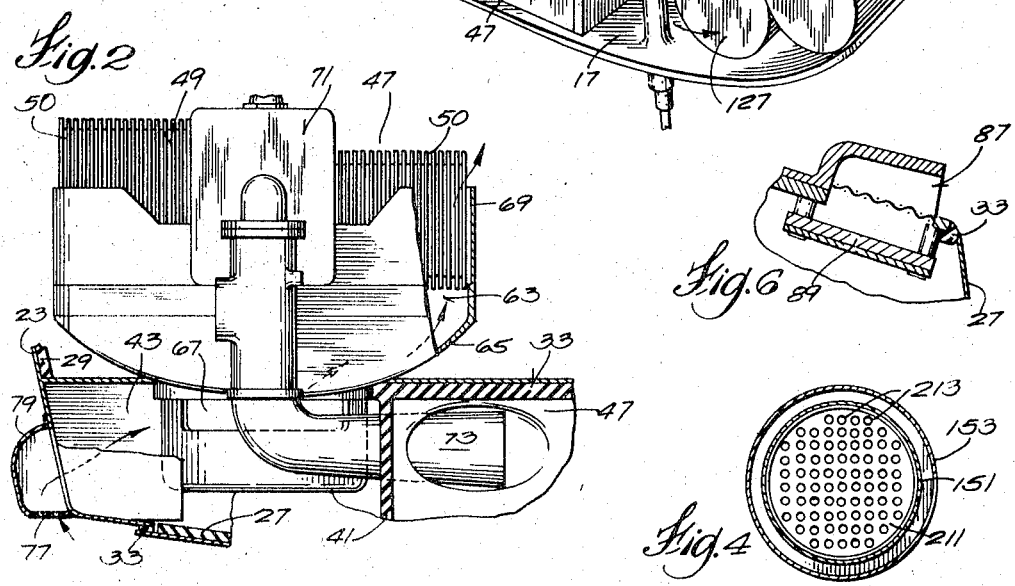
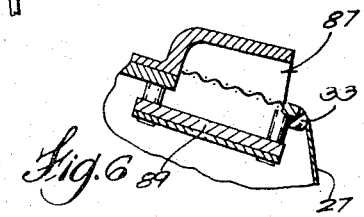
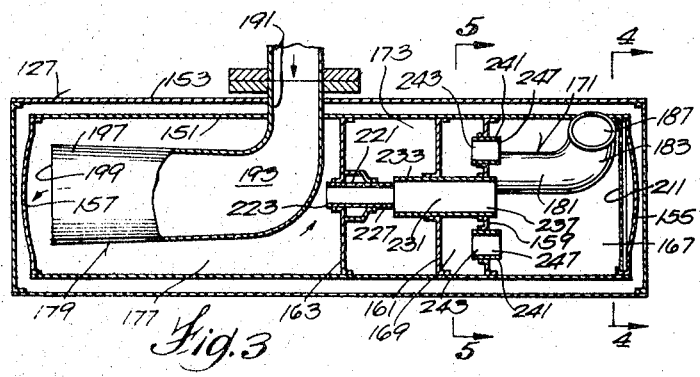
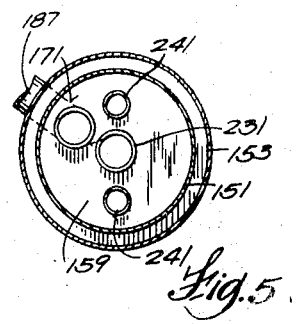

QUIET SNOWMOBILE

This is a division of application Ser. No. 258,260 filed May 31, 1972, now Pat. No. 3,810,518.

BACKGROUND OF THE INVENTION

The invention relates generally to snowmobiles and particularly to arrangements for reducing noise emanation from snowmobiles. The invention also relates to mufflers.

Although snowmobiles have enjoyed increasing popularity in the recent years, nevertheless snowmobiles have been subject to increasing criticism as being excessively noisy. The invention is directed toward eliminating or reducing this criticism. Reduced snowmobile sound emanation is achieved with the invention by modification of conventional snowmobile construction and by improvement in muffler construction.

SUMMARY OF THE INVENTION

The invention provides a snowmobile in which the engine compartment, under the hood forwardly of the dashboard, is constructed so as to be, except for one or more baffled inlets and outlets, substantially closed and airtight so as to retain therein, noises generated by engine operation and in which the substantially closed engine compartment is divided by suitable wall means into an air supply chamber communicating with a baffled inlet and an exiting air chamber which communicates with a baffled air outlet and with the air supply chamber through the cooling system of an internal combustion engine located in the engine compartment.

In accordance with the invention, the air supply chamber is sub-divided by suitable wall means into an entering air sub-chamber which communicates with the engine cooling system and into a carburetor air supply sub-chamber which communicates with the entering air sub-chamber and with the carburetor air inlet.

Various snowmobiles have coventionally employed two cylinder engines and, in accordance with the invention, separate mufflers are provided for each cylinder and are located in the exiting air chamber of the engine compartment and in physically parallel relation to each other. In addition, in accordance with the invention, mufflers of improved construction are provided. More specifically, in this last regard, a muffler in accordance with the invention includes a single megaphone chamber with a single megaphone having an outlet adjacent to an end wall of the muffler. In addition to the megaphone chamber, a muffler in accordance with the invention is sub-divided, in axially adjacent series, into a central chamber, an outlet chamber and an end chamber. Pipe means are arranged so that exhaust gas flow is from the megaphone chamber to the central chamber, then to the end chamber where the direction of flow is reversed, then to the outlet chamber, and then into the exhaust outlet pipe. In addition, in accordance with the invention, the end chamber includes in adjacently spaced relation to the end wall, a baffle which is perforated so that it is approximately 50 percent open.

Also in accordance with the invention, the battery and the fuel pump of the snowmobile are preferably located in the air supply chamber as compared to the exiting air chamber so as to avoid the higher temperatures found in the exiting air chamber.

Also in accordance with the invention, the carburetor air supply chamber is formed so as to have a volume which is at least as great as the total piston displacement of the associated engine.

Also in accordance with the invention, the air supply camber and the exiting air chamber include various means for causing change in the direction of flow of air so as to assist in reducing transmission of noise. These means include formation of the chambers and sub-chambers themselves, the use of baffles, such as the air inlet and exiting air baffles, as well as baffles in the sub-chambers, the use of other components as baffles, i.e., for instance, the battery, and the use of screened ports and rotary deflectors.

Another of the aspects of the invention resides in the employment of the mufflers in the exiting air chamber and the provision for circulation of air within the exiting air chamber so as to help reduce the temperature of the mufflers and thereby extract a greater amount of heat from the exhaust and thereby reduce the exhaust noise.

A still further object of the invention is the arrangement by which the exhaust outlet pipes from the mufflers pass through the bottom wall of the engine compartment for discharge of exhaust gases underneath the snowmobile.

Still another feature of the invention is the use of sound absorbing lining interiorly of the engine compartment and in connection with the baffled inlet and outlet ports.

One of the objects of the invention is the provision of an improved snowmobile constructed so as to operate at a substantially reduced noise level.

Another of the principal objects of the invention is the provision of a new and improved muffler having significant noise reduction capabilities without causing adverse reduction in engine horsepower output.

Another of the principal objects of the invention is the provision of an arrangement for circulating air inside ot the engine compartment of a snowmobile.

Another of the principal objects of the invention is the provision of an arrangement for preventing vapor lock and overheating of the fuel pump and battery of a snowmobile.

Another of the principal objects of the invention is the provision of an arrangement for supplying air to a carburetor so as to substantially reduce or eliminate emanation from the snowmobile of carburetor intake noise.

Other objects and advantages of the invention will become known by reference to the following description and accompanying drawings.

DRAWINGS

FIG. 1 is a fragmentary perspective view partially broken away and in section of a snowmobile embodying various of the features of the invention.

FIG. 2 is a fragmentary view partially broken away and in section of a portion of the apparatus shown in FIG. 1.

FIG. 3 is an enlarged axial sectional view of one of the mufflers included in the construction shown in FIG. 1.

FIG. 4 is a sectional view taken along line 4—4 of FIG. 3.

FIG. 5 is a sectional view taken along line 5—5 of FIG. 3.

FIG. 6 is a fragmentary sectional view taken along line 6—6 of FIG. 1.

Before explaining the invention in detail, it is to be understood that the invention is not limited in its application to the details of construction and arrangement of parts set forth in the following general description and illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in FIG. 1 is a snowmobile 11 comprising a longitudinally extending frame 13 including a forward frame portion 17 which, in general, provides the bottom wall of an engine compartment or chamber 19. Extending upwardly from the frame 13 and forwardly of the snowmobile seat 21 (shown fragmentarily) is a transverse partition or wall 23 which can form a dashboard and which provides another wall of the engine compartment 19. Extending from the frame portion 17 and from the transverse partition or wall 23 is a hood or cover 27 which completes the engine compartment 19 and which, if desired, can be hinged to the front of the frame portion 17 for movement between an open position affording access to the engine compartment 19 and a closed position which, except as will be explained, substantially closes the engine compartment 19.

In order to reduce sound transmission from the engine compartment 19, and in accordance with the invention, the hood 27 is preferably of arcuate configuration throughout and is also preferably lined with a sound absorbant material, such as a polyurethane foam in blanket form. The interior surface 29 of the transverse partition 23 or dashboard can also be so lined and, if desired, the interior surface 31 of the frame portion 17 can be so lined. In addition, a soft rubber gasket 33 is desirably provided at the junction of the hood 27 with the frame portion 17 and with the transverse partition 23 so that when the hood 27 is closed, there is provided a seal between the hood 27 and both of the frame portion 17 and the transverse partition 23, thereby rendering the engine compartment substantially airtight, except as will be explained, and reducing the transmission of noise from the snowmobile generally, and particularly, from the engine compartment.

Also in accordance with the invention, the engine compartment 19 is subdivided by wall means 45 into an air supply chamber 37 and an exiting air chamber 39. Further in accordance with the invention, the air supply chamber 37 is subdivided by additional wall means 41 into an entering air sub-chamber 43 and a carburetor air supply sub-chamber 47 which includes a roof 48, shown fragmentarily in FIG. 1 bridging between the wall means 45 and the additional wall means 81.

Mounted from the frame 13, preferably by conventional resilient mounts (not shown) within the engine compartment 19 and principally in the exiting air chamber 39, is a conventionally constructed internal combustion engine 49 which can be either of the two-stroke or four-stroke type. While various arrangements are possible, in the specifically illustrated construction, the engine 49 is conventionally constructed and is an oppositely acting two-stroke engine including (see FIG. 2) two air cooled cylinders 50 each including a piston (not shown) and an exhaust port. The engine 49 also includes, as shown in FIG. 1, an air cooling system 61 comprising means (See FIG. 2) defining a cooling air passage 63 which projects through the wall means 45 and which communicates between the air supply chamber 43 and the exiting air chamber 39. While various means can be employed, in the specifically illustrated construction, such means includes a shroud 65 having an air inlet 67 communicating with the entering air sub-chamber 43 and further having shroud portions 69 communicating with the exiting air chamber 39 and arranged relative to the cylinders 50 to guide air flow over the engine cylinders 50.

Also included in the engine 49 (See FIG. 2) is a conventional carburetor 71 operably communicating with the engine cylinders 50 and including an air inlet 73 communicating, in accordance with the invention, with the air supply chamber 37. In the specifically illustrated construction, the carburetor air inlet 73 extends through the wall means 41 and communicates with the carburetor air supply sub-chamber 47.

In order to supply air to the air supply chamber 37, one or more baffled air inlet means are provided in one or more of the hood 27, transverse partition 23, and frame portion 17. While various arrangements can be employed, in the illustrated construction, such air inlet means communicates with the entering air sub-chamber 43 and includes an entering air inlet port 77 provided in the transverse partition 23 on one side of the snowmobile, together with a baffle 79 which is preferably lined with sound absorbing material and which extends in opposing relation to the entering air port to cause change in the direction of air flowing into the entering air sub-chamber 37.

The entering air sub-chamber 37 is also arranged to communicate with the carburetor air supply sub-chamber 47 through a port 81 in the additional wall means 41 separating the entering air sub-chamber 43 and the carburetor air supply sub-chamber 47. Preferably, the port 81 is provided with a screen, such as a filter, to prevent dirt or debris from entering into the carburetor air supply sub-chamber 47. Accordingly, except for the entering air inlet port 77, the port 81 between the entering air sub-chamber 43 and the carburetor air supply sub-chamber 47, and the engine cooling system air inlet 67, the entering air sub-chamber 43 is substantially closed when the hood 27 is in closed position.

Except for communication with the port 81 and with the carburetor air inlet 73, the carburetor air supply sub-chamber 47 is substantially closed, independently of the hood or cover 27, and, in order to reduce sound emanation from the snowmobile and particularly from the engine compartment, preferably has a volume exceeding the total displacement of both pistons.

The exiting air chamber 39 is also substantially airtight when the hood 27 is closed, except for communication through the engine cooling air shroud 67 with the air supply chamber 37 and except for one or more baffled air outlet means located in one or more of the hood 27, transverse partition 23, and frame portion 17. While various arrangements can be employed, in the specifically illustrated construction, such air outlet means comprises an exiting air port 87 located in the transverse partition 23 on the opposite side of the snowmobile from the entering air port 77. In addition, the exciting air port 87 is provided with a baffle 89 which is preferably lined with sound absorbing material and which is arranged to cause one or more changes in the direction of exiting air flow and to direct exiting air in the direction away from the entering air port 79.

Because of the heat added to the air traveling over the engine cylinders 50 during passage of cooling air from the air supply chamber 37 to the exiting air chamber 39, and due to the presence in the exiting air chamber 39 of the mufflers still to be described, the general temperature in the exiting air chamber 39 is substantially elevated as compared to the air temperature in the air supply chamber 37.

Means are provided in both the entering air sub-chamber 43 and the carburetor air supply sub-chamber 47 for causing changes in direction of air flow. Preferably, multiple changes in air flow are provided. In this regard, in the illustrated construction, in the carburetor air supply sub-chamber 47, the wall means defining the carburetor air supply sub-chamber 47 is so shaped to cause at least one change in air flow direction during travel from the port 81 to the carburetor air inlet 73. In order to obtain additional air flow directional change, there is preferably provided a baffle 91 which extends transversely of the flow path between the port 81 and the carburetor air inlet 73.

In the entering air sub-chamber 43, changes in air flow directions are provided by baffling the entering air port by the location of the air inlet 67 in the engine shroud 65 in relation to the entering air port 77, and by location of a battery 93 or other baffling member in the path of air travel from the entering air port 77. In the specifically illustrated construction, the battery 93 is located in opposed or blocking relation to the port 81 connecting the entering air sub-chamber 43 and the carburetor air supply sub-chamber 47 to thereby cause air flow direction change.

Location of the battery 93 in the air flow path in the air supply chamber 37, as compared to the exiting air chamber 39, also serves to retain the battery 93 at a relatively cool operating temperature, particularly as compared to if the battery were located in the relatively hot exiting air chamber 39. A fuel pump 97 is also desirably located in the air supply chamber 37 so as to prevent excessive heating of the fuel.

The engine 49 is drivingly coupled to a conventional transmission 99 which includes a rotary member 101 arranged so as to be at least partially in the path of cooling air flowing from the engine shroud 65. The rotary member 101 is driven by the engine 49 by means not a part of the invention and includes a series of radially extending and circumferentially spaced vanes or fins 103 which act as fan blades during member rotation, which prevent direct flow of cooling air from the engine shroud 65 to the exiting air port 87 and which cause air circulation within the exiting air chamber 39 of cooling air flowing from the engine shroud 65. As a result of the air circulation effected by the rotating member 101, increased cooling of the exhaust pipes and mufflers is achieved, thereby permitting greater noise suppression by the mufflers.

Also in accordance with the invention, each of the two exhaust ports is separately connected by respective exhaust conduits or pipes 121 and 123 to respective mufflers 127 and 129 which, in turn, are connected to respective exiting exhaust pipes 131 and 133 which pass out of the exiting air chamber 39, preferably through the frame portion 17, for discharge of exhaust gases under the snowmobile 11. The separate mufflers 127 and 129 are mounted by suitable straps 135 from the frame portion 17 in parallel relation to each other in the front portion of the exiting air chamber 39. Although one of the features of the invention is the employment of a separate muffler for each cylinder, nevertheless the mufflers are, except for being left and right handed, of generally identical construction and, accordingly, only the muffler 127 will be described in detail.

The muffler 127 comprises a generally tubular structure which is preferably double walled including an inner housing 151 and an outer housing 153 with the area therebetween occupied, at least in part, by a sound and temperature insulating material which is substantially unaffected by heat. On such fibrous material is CERAFELT which is sold by the K. W. Muth Co. of Sheboygan.

The inner housing 151 includes a cylindrical wall closed at its end by opposed end walls 155 and 157 which are slightly outwardly dished together with a series of axially spaced first, second, and third transverse baffles or partitions 159, 161 and 163 which divide the muffler 127 into a series of chambers including an end chamber 167 located between the end wall 155 and the first partition 159, an outlet chamber 169 which is located between the first and second partitions 159 and 161 and which communicates with a discharge or exit pipe 171 connected to the exhaust pipe 131, a central chamber 173 which is located between the second and third partitions 161 and 163, and an inlet or megaphone chamber 177 which is defined between end wall 157 and the third partition 163 and which houses an inlet megaphone 179. If desired, the central chamber 173 can be omitted. The axial spacing of the first, second and third partitions 159, 161 163 relative to each other and relative to the end walls 155 and 157 is preferably as generally shown in the drawings. In one specific embodiment of the invention, the muffler had an over-all length of approximately 18 ¾ inches between the plane of the circumferential periphery of the end walls 165 and 157 and the megaphone chamber 177 was approximately 10 inches long. The central chamber 173 was 3 inches long, the outlet chamber 169 was 1 ½ inches long and the end chamber 167 was 4 ¼ inches long.

The muffler exhaust discharge or exit pipe 171 includes an inlet portion 181 communicating with the outlet chamber 169 and extending axially in the outlet chamber 169 and through the first partition 159. The exhaust pipe further includes an elbow portion 183 which is located in the end chambr 167 and which communicates with the inlet portion 181 and with an outlet portion 187 which extends radially outwardly through the outer housing 153 and is connected to the exhaust discharge pipe 131. In one specific embodiment of the invention, the muffler exhaust discharge or exit pipe 171 has a more or less uniform diameter of slightly less than 1 ⅜ inches through out the length thereof. The diameter of the muffler exhaust discharge or exit pipe 171 is believed to be of importance to the proper functioning of the muffler.

The exhaust megaphone 179 includes a flanged inlet potion 191 which is connected to the exhaust ducts 121 and which extends radially outwardly from the megaphone chamber 177 adjacent to the third partition 163.

The megaphone 179 also includes an elbow portion 193 which is located within the megaphone chamber 177 and which communicates with the inlet portion 191, together with an outlet portion 197 which is also located in the megaphone chamber 177, which extends from the elbow portion 193 and has an outlet 199 adjacent to the end wall 157, and which has an axially transverse cross sectional area which increases in the direction from the elbow portion 193 toward the outlet 199. In one specific embodiment of the invention, the megaphone 179 had a length along the axis of the muffler 127 of slightly over 7 ¾ inches between the outlet 199 and the centerline of the radially extending inlet portion 191. The length of the megaphone 179 along the axis of the muffler 127 is believed to be of importance to the proper functioning of the muffler.

Located in the end chamber 167 in closely adjacent spaced relation from the end wall 155 is a perforated baffle 211 which includes (See FIG. 4) a series of holes or openings 213. In one specific embodiment of the invention, the baffle 211 was located about ¼ inch from the plane of the circumferential periphery of the adjacent end wall 155 and the holes 213 had a diameter of about ¼ inch. The number of holes 213 and the diameter of the holes 213 provided an open area of about 48 percent of the total area of the baffle 211. While the percentage of open area, as well as the mumber and diameter of the holes 213 are believed to be of importance to the proper functioning of the muffler 127, various arrangements of the holes 213 relative to each other can be employed. In the illustrated construction, the holes 213 are staggered as shown with a spacing between centers of approximately 0.687 inch.

Exhaust gas flows from the outlet 199 of the megaphone chamber 177 into the central chamber 173 through a pair of generally identical pipes or tubes 221 which extend axially of the muffler 127 and are diametrically spaced from each other at a common radius extending between the axis of each tube to the muffler axis. In one specific embodiment of the invention, the tubes 221 are located at a common radius of about 1 ⅝ inches and each tube 221 has a diameter slightly under ⅞ inch and a length of approximately 2 ½ inches. The tube lengths, as well as the employment of two tubes 221 and the individual tube cross sectional area as well as the total cross sectional area are believed to be of importance to the proper functioning of the muffler 127. In addition, each tube 221 has an inlet portion 223 projecting into the megaphone chamber 177 for a distance of approximately ⅜ inch and an outlet portion 227 projecting into the central chamber 173 for about 2 ⅛ inches.

From the central chamber 173, exhaust gas flows to the end chamber 167 (by passing the intermediate outlet chamber 169) through a pipe or tube 231 which is coaxial with the muffler axis. In one specific embodiment of the invention, the pipe has an inside diameter slightly less than 1 ¼ inches, which dimension is believed to be important to the proper functioning of the muffler.

In addition to extending completely through the outlet chamber 169, the pipe 231 has an inlet portion 233 projecting into the central chamber 173 and an outlet portion 237 projecting into the end chamber 167. The amount of projection into the central chamber 173 and end chamber 167 can be varied as desired, except that it is believed to be important to the proper functioning of the muffler that the projecting outlet portions 227 of the pipes 221 axially overlap the projecting inlet portion 233 of the pipe 231 so as to require circuitous travel within the central chamber 173 from the pipes 221 to the pipe 231. The amount of overlap may be varied as desired.

In the end chamber 167, gas flows through the holes 213 in the baffle 211 and then reverses direction after striking the end wall 155 and then travels back through the holes 213 in the baffle 211.

From the end chamber 167, exhaust gas flows to the outlet chamber 169 through a pair of generally identical pipes 241 which are diametrically spaced from each other at a right angle with respect to the diametric spacing of the pipes 221 and at a common radius extending between the axis of each tube 241 to the muffler axis. In one specific embodiment of the invention, the pipes or tubes 241 each have an inner diameter of slightly less than ⅞ inch and a length of approximately 1 inch. The tube lengths, the employment of two tubes, and the individual tube cross sectional areas, as well as total cross sectional area, are believed to be of importance to the proper functioning of the muffler. Each of the pipes includes an inlet portion 243 which projects into the end chamber 167 and an outlet portion 247 which projects into the outlet chamber 169. However, the length of such projecting portions can be varied as desired.

Various of the features of the invention are set forth in the following claims.

I claim:

1. A muffler comprising a generally tubular housing having opposed end walls, a first barrier spaced axially from one of said end walls and defining, with said one end wall, an end chamber, a second barrier spaced axially from said first barrier in the direction away from said one end wall and defining, with said first barrier, an outlet chamber, a third barrier spaced axially from said second barrier in the direction away from said one end wall and defining, with said second barrier, a central chamber and defining, with the other of said opposed end walls, a megaphone chamber, a single exhaust megaphone in said megaphone chamber and including an outlet portion terminating adjacent to said other end wall, a first pipe extending from said megaphone chamber to said central chamber, a second pipe extending from said central chamber to said end chamber, a third pipe extending from said end chamber to said exhaust chamber, and an exhaust discharge pipe having a discharge portion extending from said outlet chamber outwardly of said housing.

2. A muffler comprising a generally tubular housing having opposed end walls, a perforated baffle in adjacently spaced and parallel relation of one of said opposed end walls, a first barrier spaced axially from said perforated baffle in the direction away from said one end wall and defining, with said one end wall, an end chamber, a second barrier spaced axially from said first barrier in the direction away from said one end wall and defining, with said first barrier, an outlet chamber and defining, with the other of said opposed end walls, a megaphone chamber, a single exhaust megaphone in said megaphone chamber and including an outlet portion terminating adjacent to said other end wall, passage means connecting said megaphone chamber to said end chamber, a pipe extending from said end chamber to said exhaust chamber, and an exhaust discharge pipe including a discharge portion extending from said outlet chamber outwardly of said housing.

3. A muffler comprising a generally tubular housing having opposed end walls, a perforated baffle in adjacently spaced and parallel relation to one of said opposed end walls, a first barrier spaced axially from said perforated baffle in the direction away from said one end wall and defining, with said one end wall, an end chamber, a second barrier spaced axially from said first barrier in the direction away from said one end wall and defining, with said first barrier, an outlet chamber, a third barrier spaced axially from said second barrier in the direction away from said one end wall and defining, with said second barrier, a central chamber and defining, with the other of said opposed end walls, a megaphone chamber, a single exhaust megaphone in said megaphone chamber and including an inlet portion extending radially outwardly from said megaphone chamber and having an outlet portion extending at a right angle to said inlet portion and terminating adjacent to said other end wall, a first tubular pipe extending from said megaphone chamber to said central chamber, a second tubular pipe extending from said central chamber to said end chamber, a third tubular pipe extending from said end chamber to said outlet chamber, and an exhaust discharge pipe having an inlet portion extending in said outlet chamber, and a discharge portion extending from said inlet portion and outwardly of said housing.

* * * * *